Dec. 27, 1938.  H. E. SUDLOW  2,141,454
CATTLE FLY TRAP
Filed Oct. 26, 1937  3 Sheets-Sheet 1
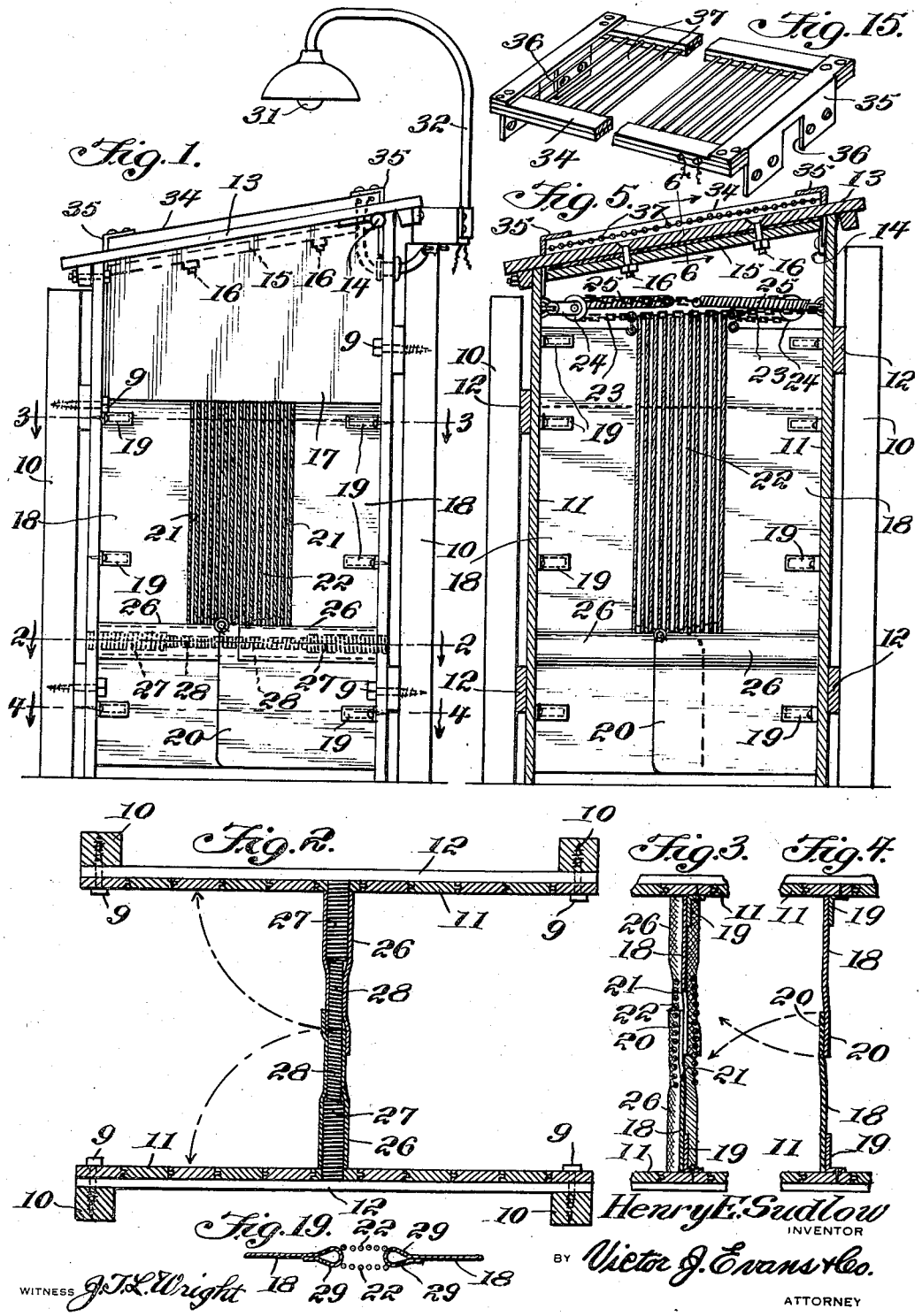

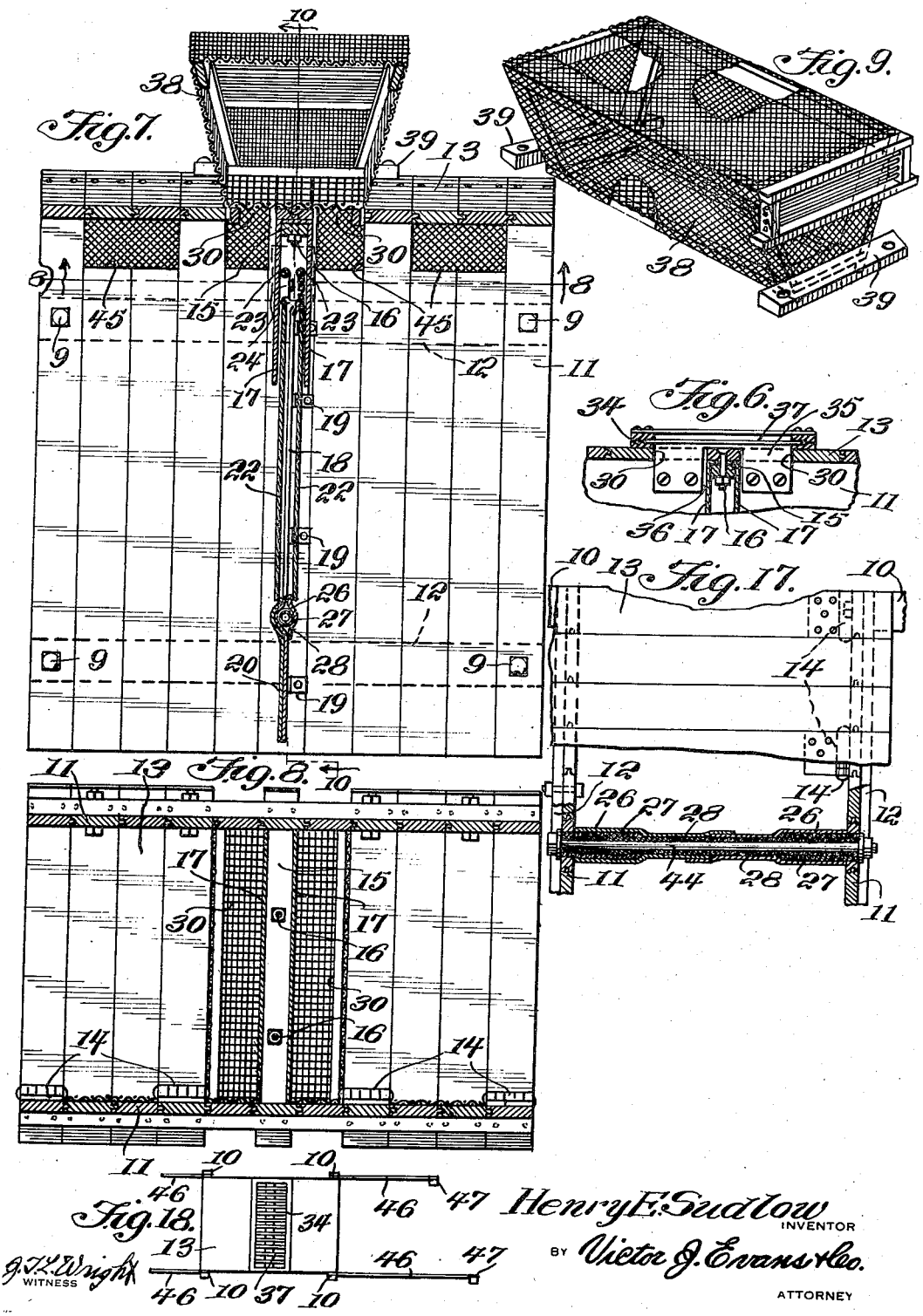

Dec. 27, 1938. H. E. SUDLOW 2,141,454
CATTLE FLY TRAP
Filed Oct. 26, 1937 3 Sheets-Sheet 3
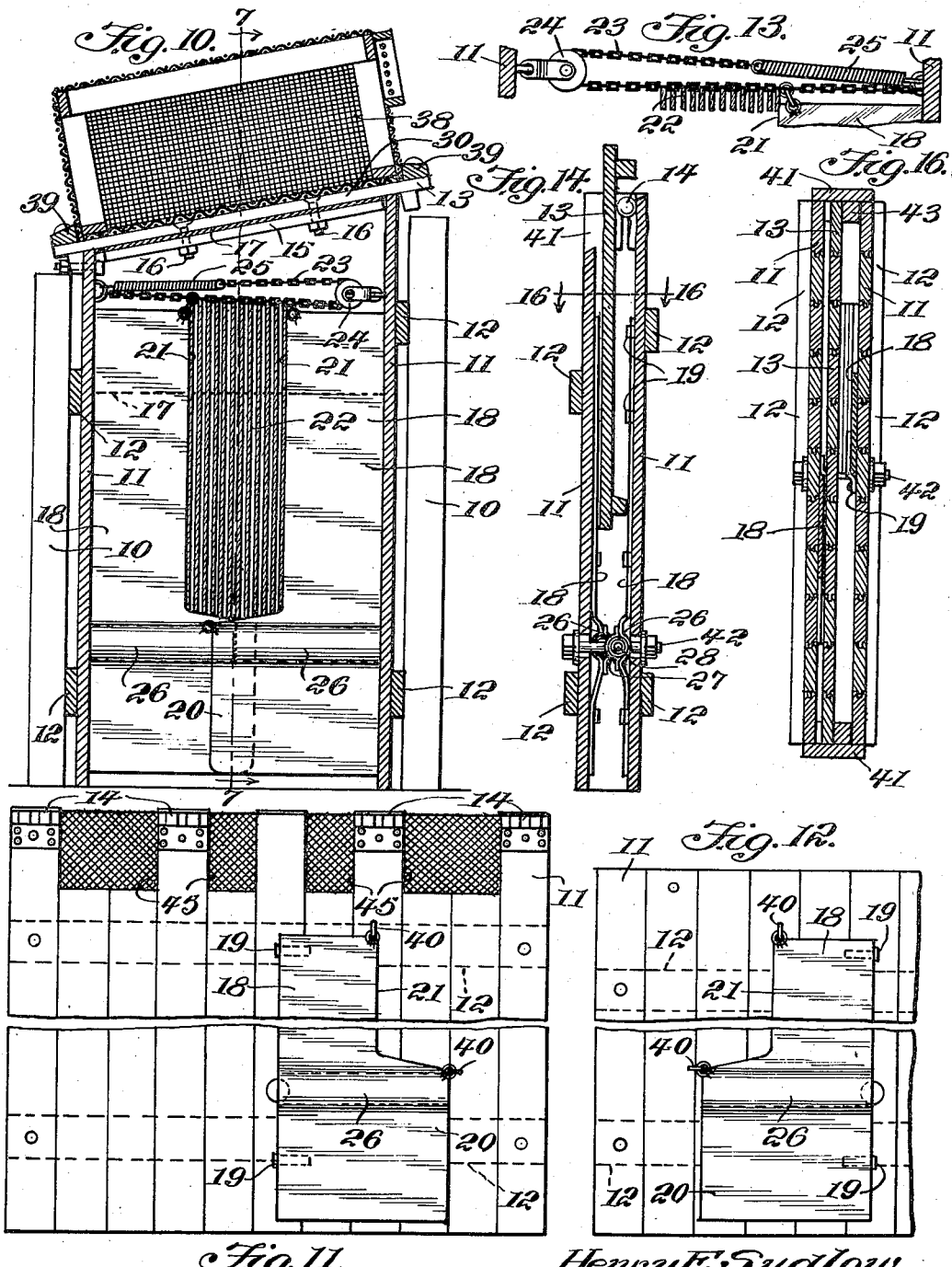
Henry E. Sudlow, INVENTOR
BY Victor J. Evans & Co.
ATTORNEY
WITNESS J. T. L. Wright Patented Dec. 27, 1938

2,141,454

UNITED STATES PATENT OFFICE 2,141,454

CATTLE FLY TRAP

Henry E. Sudlow, Coral Gables, Fla.

Application October 26, 1937, Serial No. 171,106

4 Claims. (Cl. 119—156)

This invention relates to cattle fly traps and has for an object first to provide a device of this character in which the live stock may move through and be deflied, and second, to provide apparatus adapted to destroy insects electrically or by impounding and starvation.

A further object is to provide a device of this character having a light-entrance opening in the roof toward which the flies will rise and lodge against an electrocuting device or as an alternative, will be trapped in a screen trap, for automatic destruction by starvation.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is an end elevation of a trap constructed in accordance with the invention.

Figure 2 is a cross sectional view taken on the line 2—2 of Figure 1 showing the nested springs for closing the door sides.

Figure 3 is a cross sectional view taken on the line 3—3 of Figure 1 showing two lines of the rope or string portions of the fabric door.

Figure 4 is a cross sectional view taken on the line 4—4 of Figure 1 showing the overlapping lower inside edges of the door sides.

Figure 5 is a vertical sectional view of the covered chute and showing the electrocuting device at the top of the chute.

Figure 6 is a cross sectional view of the electrocuting device taken on the line 6—6 of Figure 5.

Figure 7 is a cross sectional view of a different form of the device from Figure 1, taken on the line 7—7 of Figure 10 looking toward the high frame wall of the trap.

Figure 8 is a cross sectional view taken on the line 8—8 of Figure 7 looking toward the screen trap and light opening at the top of the device.

Figure 9 is a perspective view of the screen trap.

Figure 10 is a vertical sectional view taken on the line 10—10 of Figure 7.

Figure 11 is a front elevation of a wall of the trap with a door side folded for transportation.

Figure 12 is an elevation of the door side showing the same folded back and hooked against the chute wall.

Figure 13 is a detail sectional view showing the chain, spring and pulley for yieldably supporting a door side at the top.

Figure 14 is a longitudinal sectional view of the trap folded for transportation.

Figure 15 is a perspective view of the electrocuting device.

Figure 16 is a cross sectional view taken on the line 16—16 of Figure 14.

Figure 17 is a sectional view showing the use of a stabilizer built for setting up the closed top chute in a desired location.

Figure 18 is a plan view of the chutes and trap shown in Figure 1 and showing the open top chutes at the entrances of the closed top chute.

Figure 19 is a detail sectional view showing the edges of the curtains as being ballon shape.

Referring now to the drawings in which like characters of reference designate similar parts in the various views, 10 designates corner posts. Parallel side walls 11 preferably formed of tongue and groove boards nailed to transverse bars 12, are secured to the posts by lag screws 9, as best shown in Figure 2. One wall is higher than the other, as best shown in Figure 1 and between these walls the live stock to be deflied will pass.

As best shown in Figures 1 and 5 a cover 13 is hinged as shown at 14 to the high wall and slopes downwardly to the rear wall. A bar 15 is secured to the underneath face of the cover by bolts 16, as best shown in Figure 5. From this bar an inverted U-door top section 17 is suspended, the section being inverted as best shown in Figure 7, the falls of the section hanging down from opposite sides of the bar in spaced relationship to engage the upper parts of an animal passing between the walls.

As best shown in Figures 1, 2, 5 and 7 a pair of door sides 18, formed of comparatively stiff waterproof fabric material such as heavy rubberized duck or the like, are hinged by fabric hinges 19 to the walls 11. The door sides overlap as shown at 20 at the bottom and may be cut away above the overlapped portions as shown at 21 to lessen wear and pulling out of shape, and to receive between them a cord apron 22. The door sides 20 and cord apron 22 brush flies off the animals.

The door sides are suspended at the inner top from the walls by means of chains 23, of the general type shown in Figure 13, the chain of each curtain passing over a pulley 24 on one of the walls 11 and being terminally equipped with a spring 25 which is secured to the other wall 11 to yieldably tension the door side tops.

When an animal passes between the walls 11 the overlapped portions 20 of the door sides aid in preserving darkening effect which taken with proper lights above dislodges flies from the legs and belly, while the rope apron 22 is pushed out of way. The door sections will be returned to initial position after passage of each animal ready for the next de-flying operation by the door closers 27.

Each door side section has a transversely disposed closed loop 26 formed therein near the top of the overlapping portion 20. A helical spring 27 of relatively large diameter is disposed in the loop near the wall acting as a door closer while a helical spring 28 of comparatively small diameter is telescopically received in the spring 27 and projects to near center of chute transversely so spring ends will pass each other freely. Thus the hinged portions of the sides will be stiffer than the free edge portions so that the free edge portions may permit leg passage while permitting passage of a minimum of light.

Preferably the inner edge portions of the door sides above are ballooned out as shown at 29 in Figure 19, this structure being produced by forming rather large hems in the upright edges of the curtains.

As will best be observed by referring to Figure 7 the cover 13 is provided with light entrance openings 30 on opposite sides of the bar 15. An electric light 31 is suspended above the light entrance openings for night use and for dark days. A bracket 32 supports the light, and is attached to a transformer case, in this instance, which is secured to the high wall near the top thereof. Flies rising in the covered chute to the light entrance openings may be either electrocuted by an electrocution device, shown best in Figure 15 or may be trapped by a wire mesh trap, shown best in Figure 9, for destruction by starvation.

The electrocution device comprises a frame 34 which is equipped at the end with steel angle plates 35 provided with openings 36 to receive the bar 15. The angle plates are bolted to the side walls 11 at the top thereof on opposite sides of the bar. A plurality of conductor wires 37 are disposed transversely of the frame, near enough together to prevent a fly passing therebetween. The wires may be alternately grounded and live wires to form circuit terminals of the electrocuting circuit. Any other type of electrocution device may be used.

The fly trap may be substituted for the electrocuting device. The fly trap comprises a wire mesh open bottom traps 38, which admits live flies on the wing, but prevents their exit. As best shown in Figure 9, the trap is provided at the bottom with bars 39, which may be bolted to the cover 13, in position to permit the flies escaping upwardly through the light entrance openings 30, to enter the trap. The trap is larger at the top than at the bottom so that the flies will drop out as they die.

To collapse the device for transportation or storage the walls 11 are removed from the posts. The door sides 18 are then folded back against the walls and hooked over hooks 40 in the walls. The hinged cover 13 is folded down and the low wall is placed against outside of high wall. The collapsed parts are then bolted together by bolts 42, and cleats are secured to the sides.

To set up the device as best shown in Figure 17, the low wall 11 is first set up on two of the posts 10 twenty-five inches apart and bolted thereto. Then a bolt 44 is passed through the bores of the door closers 27 to determine the position of the high wall 11. The high wall posts 10 may then be mounted and likewise bolted whereupon the low wall may have its roof bolts tightened and the bolt 44 withdrawn. The top is then swung into position upon the walls, it having previously been swung up before the walls are put in place.

Preferably the high wall 11 is provided with screened openings 45 at the top thereof to admit light to the top of the de-flying covered chute so that the flies rising from below will follow their host to the brighter light at roof opening where they will either be electrocuted or trapped in the screen trap as above described.

A most important feature of the invention is shown in Figure 18 in which a pair of parallel opaque walls 46 are disposed on opposite sides and at each end of the entrances to the covered chute. These opaque walls are secured to the walls 11 and to posts 47. They extend upwardly from the ground to substantially 5 or 6 feet on sun side and 4 or more on opposite sides and provide a darkened space between them. These walls constitute the beginning of a light and shadow control which removes flies from cattle during passage through the series of chutes and lands these insects either against an electrified screen or an impounding trap.

From the above description it is thought that the construction and operation of the invention will be fully understood without further explanation.

What is claimed is:

1. A de-flying chute for animals comprising side walls between which the animal may pass, a top connected to the side walls and having an opening for admitting light to attract flies upwardly between the side walls, flexible sectional door sides secured to the walls having the lower portions overlapped, springs in the overlapping portions of the door sides for closing the sides to rub flies off the legs of an animal, an inverted U-door top section suspended from the top and overlapping the door side upper ends, and means on said top for destroying flies rising to said light admitting opening.

2. The structure as in claim 1 in which said springs are each formed of a short spring secured at one end to one wall and a smaller spring telescoped into the short spring whereby the free edge of the door is more flexible than the secured edge of the door.

3. A de-flying chute for animals comprising spaced walls between which the animal to be de-flied may pass, a top connected to the walk, flexible sectional fabric door sides hingedly connected at the outer edges to the walls and having overlapped lower ends, tension means supporting the inner upper edges of the door sides at the top upon the walls and permitting the door sides to yield to a passing animal while preventing any light from appearing between it and said door sides, means tensioning the lower overlapped ends of the door sides for admitting a minimum of light during leg passage, light admitting openings in said top and in the top of one of the walls inducing flies to abandon darkened areas for those areas best lighted at high levels, and means on the top for destroying the flies.

4. A de-flying chute for animals comprising a top having a light admitting opening, spaced walls between which the animals to be de-flied may pass, flexible door sides hinged at the outer edges to the walls, the lower ends of the door sides being overlapped, resilient means supporting the door sides at the upper ends upon the walls, resilient means carried by said overlapped portions of the door sides for controlling the sides to brush off flies from the legs of an animal, a cord apron between the door sides, means on the top communicating with said opening for destroying flies, and an open top chute at each end of the side walls extending in prolongation of said walls.

HENRY E. SUDLOW.